(12) United States Patent
Glassenberg et al.

(10) Patent No.: US 11,176,740 B2
(45) Date of Patent: Nov. 16, 2021

(54) METHODS AND SYSTEMS FOR RENDERING IMAGES

(71) Applicant: Level Ex Inc., Chicago, IL (US)

(72) Inventors: Sam Glassenberg, Chicago, IL (US);
Matthew Yeager, Chicago, IL (US);
Steven Kane, Chicago, IL (US)

(73) Assignee: Level Ex, Inc., Chicago, IL (US)

( * ) Notice: Subject to any disclaimer, the term of this patent is extended or adjusted under 35 U.S.C. 154(b) by 0 days.

(21) Appl. No.: 17/091,818

(22) Filed: Nov. 6, 2020

(65) Prior Publication Data

US 2021/0142562 A1 May 13, 2021

Related U.S. Application Data

(60) Provisional application No. 62/976,069, filed on Feb. 13, 2020, provisional application No. 62/932,238, filed on Nov. 7, 2019.

(51) Int. Cl.
*G06T 17/20* (2006.01)
*G09B 9/00* (2006.01)
*G06T 15/00* (2011.01)

(52) U.S. Cl.
CPC .......... *G06T 17/20* (2013.01); *G06T 15/005* (2013.01); *G09B 9/00* (2013.01)

(58) Field of Classification Search
CPC .......... G06T 17/20; G06T 15/005; G09B 9/00
See application file for complete search history.

(56) References Cited

U.S. PATENT DOCUMENTS

| | | |
|---|---|---|
| 9,053,535 B2 | 6/2015 | Florent et al. |
| 2005/0277096 A1 | 12/2005 | Hendrickson et al. |
| 2008/0020361 A1 | 1/2008 | Kron et al. |
| 2008/0286735 A1 | 11/2008 | Cusano |
| 2012/0041318 A1 | 2/2012 | Taylor |
| 2012/0084064 A1 | 4/2012 | Dzenis et al. |
| 2015/0029185 A1* | 1/2015 | Ikits .................. G06T 15/08 345/420 |
| 2015/0242588 A1 | 8/2015 | Audigier et al. |

OTHER PUBLICATIONS

Written Opinion cited in Application No. PCT/US2020/059450 dated Jan. 27, 2021.
International Search Report cited in Application No. PCT/US2020/059450 dated Jan. 27, 2021.

* cited by examiner

*Primary Examiner* — Xin Sheng
(74) *Attorney, Agent, or Firm* — DLA Piper LLP (US)

(57) ABSTRACT

Systems and methods are provided for rendering images. Permitted actions can be simulated. A fluoroscopic image can be rendered. The simulated permitted actions can be applied to the fluoroscopic image.

20 Claims, 29 Drawing Sheets

This is a series of images showing the rendering of multiple meshes under fluoroscopy.

FIGURE 1A

A pixel shader implements this function to run for all rasterized triangles on meshes that are rendered under fluoroscopy.

$A = FF(M1) \times CA(M1) + -BF(M1) \times CA(M1) + FF(M2) \times CA(M2) + -BF(M2) \times CA(M2)...$
where
$D$ : Distance from camera
$M1$ : Mesh 1
$M2$ : Mesh 2
$FF(mesh)$ : FrontFace of a mesh
$BF(mesh)$ : BackFace of mesh
$CA(mesh)$ : Coefficient of attenuation of mesh
$A$ : *Attenuation of ray originating from pixel in screen space in the direction of the camera*
... : *Pattern continues for arbitrary number of meshes*

This is a series of images showing the rendering of multiple meshes under fluoroscopy.

FIGURE 2A $RGB = BLOOM(COLOR\_GRADE(VIGNETTE(OVERLAY(C(M1(B1), M2(B2), ...)))))$
where
$L1$ : Layer 1
$L2$ : Layer 2
$M1$ : Mesh 1
$M2$ : Mesh 2
$B1$ : Fraction of electromagnetic signal that reached the backing buffer in Layer 1
$B2$ : Fraction of electromagnetic signal that reached the backing buffer in Layer 2
$C(layers)$ : Composite function in combine RGB buffers for a layer
$OVERLAY(RGB, RGBA)$ : premultiplied blending of fluorscopy buffer and overlay buffer
$VIGNETTE(RGB)$ : Apply vignette effect to RGB buffer
$COLOR\_GRADE(RGB)$ : Apply color – grading effect to RGB buffer
$BLOOM(RGB)$ : Apply bloom effect to RGB buffer
$RGB$ : Final pixel color
... : Pattern continues for arbitrary number of layers

FIGURE 3A $P(d) = INTERPOLATE(P(N1), (P(N2), d)$
where
$P(d)$ : interpolated property at a node
$N1$ : Node 1
$N2$ : Node 2
$INTERPOLATE(P, P, decimal)$ : Interpolation function
$P(d)$ : Property at normalized distance (0 – 1) between nodes

FIGURE 3B

These are descriptions of the key data types driving physical simulation in Cardio Ex. Note that while the notions of a "Vessel Graph" and "Tunnel Tree" mentioned, there is no explicit data structure for it. It is just represented by a root node with no parent Tunnel.

$VESSEL\_NODE <A, B> = (tunnelRoot : TUNNEL) <A> \times (b : B)$
$TUNNEL<A> = (parentTunnel : TUNNEL <A> \times (a : A) \times (offset : DECIMAL) \times (radius : F(DECIMAL))$ Example Vessel Graph

FIGURE 10

Example Steps to Create Interventional Gameplay:

1. Developer can place anatomical meshes of a patient. (see, e.g., Figure 3C and 3D.

2. Developer can author a vessel network and assign node attributes.

A. For every frame of an application, using e.g., the interpolated node attributes of FIGS. 3A and 3B a vessel network mesh and a tool mesh can be created. For example:

//Using interpolated nod attributes (Figure 3A and 3B)
        GenerateVesselNetworkMesh()
        GenerateToolMeshes()

B. The Xray can be rendered, using e.g. the equation of FIG. 1A. For example:

//Described in Figure 1A)
        RenderXRay()

C. Post-Processing can be applied, using e.g., the equations of FIG. 2A to create FIG. 2B. A vigettet effect, color grading, bloom, or a composite final image, or any combination thereof, can be applied. For example:

//Apply Post-processing (Figure 2A and 2B)
        ApplyVigettetEffect()
        ApplyColorGrading()
        ApplyBloom()
        CompositeFinalImage()

FIGURE 11

```
Public void CheckDamage()
{
    // Check for damage done to the Node
    if (initRadius >= _damageSetting.ignoreDamageInRadiusBelow)
    {
        bool hasFunctionalStent = HasImplantedStent();
        bool hasAnyCoveredStent = HasAnyCoveredStent();
        if (_radius > (initRadius * (1f + _damageSetting.percentRadiusIncrease.Rupture)))
        {
            CauseDamage(DamageType.Rupture);
        }
        else if (_radius > (initRadius * (1f + _damageSettings.percentRadiusIncrease.Perforation)))
        {
            if (!(hasFunctionalStent && hasAnyCoveredStent))
                CauseDamage(DamageType.Perforation);
        }
        else if (_radius > (initRadius * (1f + _damageSettings.percentRadiusIncrease.MajorDissection)))
        {
            if (!hasFunctionalStent)
                CauseDamage(DamageType.Dissection);
        }
    }
}
```

METHODS AND SYSTEMS FOR RENDERING IMAGES

CROSS-REFERENCE TO RELATED APPLICATIONS

This application is claims benefit to of U.S. Patent Application No. 62/932,238 filed Nov. 7, 2019, and U.S. Provisional Application No. 62/976,069, filed Feb. 13, 2020, which are incorporated by reference in their entireties.

BRIEF DESCRIPTION OF THE FIGURES

This application/patent contains at least one drawing executed in color. Once this application/patent is published, copies of this patent application with color drawing(s) will be provided by the US PTO upon request and payment of the necessary fee.

FIG. 1A illustrates an example equation that can be used to determine what color to use for each pixel in a mesh, according to aspects of the disclosure.

FIG. 2A illustrates an example equation that can be used to render a simulated x-ray, according to aspects of the disclosure.

FIGS. 3A-3B illustrate example formulas for interpolating node attributes across the vessel network, according to aspects of the disclosure.

FIG. 10 illustrates example steps that can be used to create interventional gameplay, according to aspects of the disclosure.

FIG. 11 illustrates example logic that can use the attributes, according to aspects of the disclosure.

EMBODIMENTS FOR RENDERING IMAGES

Figure 1B:
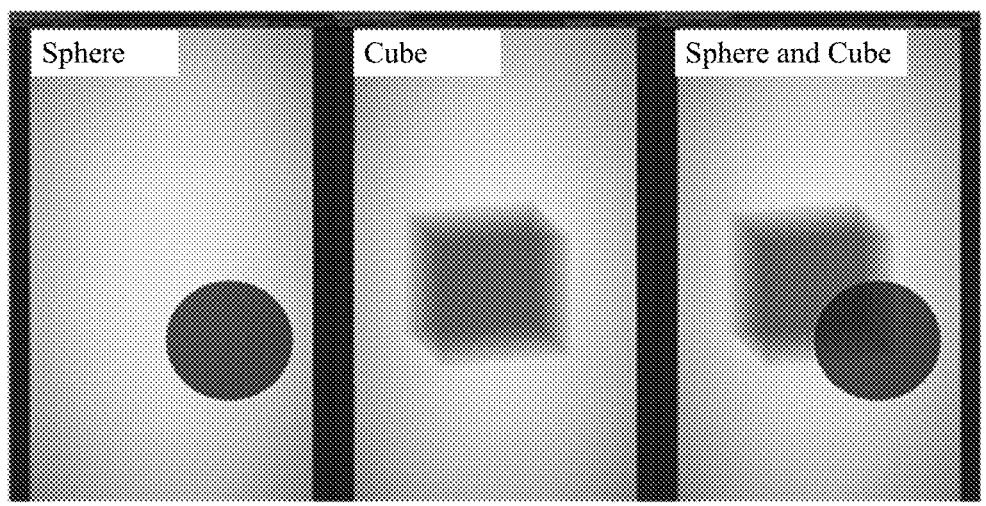
FIG. 1B illustrates an example series of images showing the rendering of multiple meshes under fluoroscopy, according to aspects of the disclosure.

In some embodiments, the following simulations can be utilized in video games. The simulations can be available for iOS and Android. In some embodiments, games for medical professionals can utilize the embodiments described herein to help sharpen cognitive and analytical skills applied at the point-of-care. In addition, actual patient cases can be created, as mobile, VR, and AR experiences, with realism and interactivity. Medical professionals can be introduced and trained on new techniques, the latest medical devices and drug therapies in a risk-free environment. In other embodiments, the games can be played by non-medical professionals as a means of entertainment.

Method and systems can be used to render the simulated images. In some embodiments, a system with various modules and databases can communicate to render the images. The example functionalities set forth below can be performed using the modules.

Example of Rendering Images

Systems and methods described herein can comprise simulating permitted actions, rendering a rendering a fluoroscopic image, and applying the simulated permitted actions to the fluoroscopic image. When simulating permitted actions, a vessel network can be represented as a discrete tree. Every node in the discrete tree can be represented as comprising another discrete sub-tree describing relationships (e.g., which can be hierarchical or non-hierarchical) between objects that are present at that node, wherein the relationships between the objects determine outcomes of permitted actions. What actions are permitted at each node using the relationships between the objects is determined. Physical properties between the nodes can be interpolated.

When rendering the fluoroscopic image, meshes can be rendered using a pixel shader. The equation of FIG. 1A can be used to determine what color to use for each pixel in the mesh. FIG. 1A can provide the distance needed to calculate attenuation, which can be used to determine the color to use for the pixel in the mesh.

In some aspects of the disclosure, front faces of the meshes can be determined. Back faces of the meshes can also be determined. For each mesh, a distance to the front face of that mesh can be multiplied by its attenuation. In addition, for each mesh, a distance to the back face of that mesh can be multiplied by its attenuation. A back face distance sum of the distances to the back faces of the meshes can be multiplied by their attenuations. A front face distance sum of the distances to the front faces of the meshes can be multiplied by their attenuations. The back face distance sum can be subtracted from the front face distance sum. Summing the distances to the front faces of the meshes and/or summing the distances to the back faces of the meshes can be done in any order. (This can be beneficial because if this needs to be rendered in a specific order, sorting may be needed, and a different (e.g., more complicated) data structure may be required. For example, more processing capability, storage, etc. may be needed if sorting is required.

In some aspects of the disclosure, the attenuation can be linearly proportional to the distance traveled in the mesh.

FIG. 10 illustrates example steps that can be used to create interventional gameplay. In 1, a developer can place anatomical meshes of a patient. (See, e.g., FIGS. 3C and 3D.) In 2, a developer can author a vessel network and assign node attributes. In 2A, for every frame of an application, using e.g., the interpolated node attributes of FIGS. 3A and 3B, a vessel network mesh and a tool mesh can be created. In 2B, an x-ray can be rendered, using e.g., the equation of FIG. 1A. In 2C, post-processing can be applied, using e.g., the equations of FIG. 2A to create FIG. 2B. In some aspects of the disclosure, multiple effects may be applied. Examples effects can include: a vignette effect (e.g., fade into its background without a definite border); color grading (e.g., enhance various attributes of an image, such as contrast, color, saturation, detail, black level, white point), bloom (e.g., embellish certain effects to make image seem more "alive"), a composite final image (e.g., combine multiple images together such as shown in FIG. 2B), a color chromatic effect, a motion blur effect, a different lens distortion effects, or a panini projection effect, or any combination thereof.

Additional example details for the method and system described herein are described in the sections below.

Rasterized Fluoroscopy

In some embodiments, the system (e.g., referred to in some embodiments as Cardio Ex) can render a convincing fluoroscopic image by exploiting the commutativity of floating-point addition and the direction of a triangle dictated by vertex winding order. A mesh that is rendered using this technique can satisfy three properties. First, a mesh can be closed such that there is always at least one entry point and exit point for any ray that intersects it. Second, the entire volume of each mesh can be assumed to have a uniform coefficient of electromagnetic attenuation. Third, the amount of electromagnetic attenuation can be linearly proportional to the distance traveled through that mesh. Equation 1A describes an example of how these properties can be exploited to achieve order-independent fluoroscopic rendering.

FIG. 1A illustrates Equation 1A, which can be used in some embodiments of the invention. In this equation, a pixel shader can implement this function to run for all rasterized triangles on meshes that are rendered under fluoroscopy.

Figure 2B:
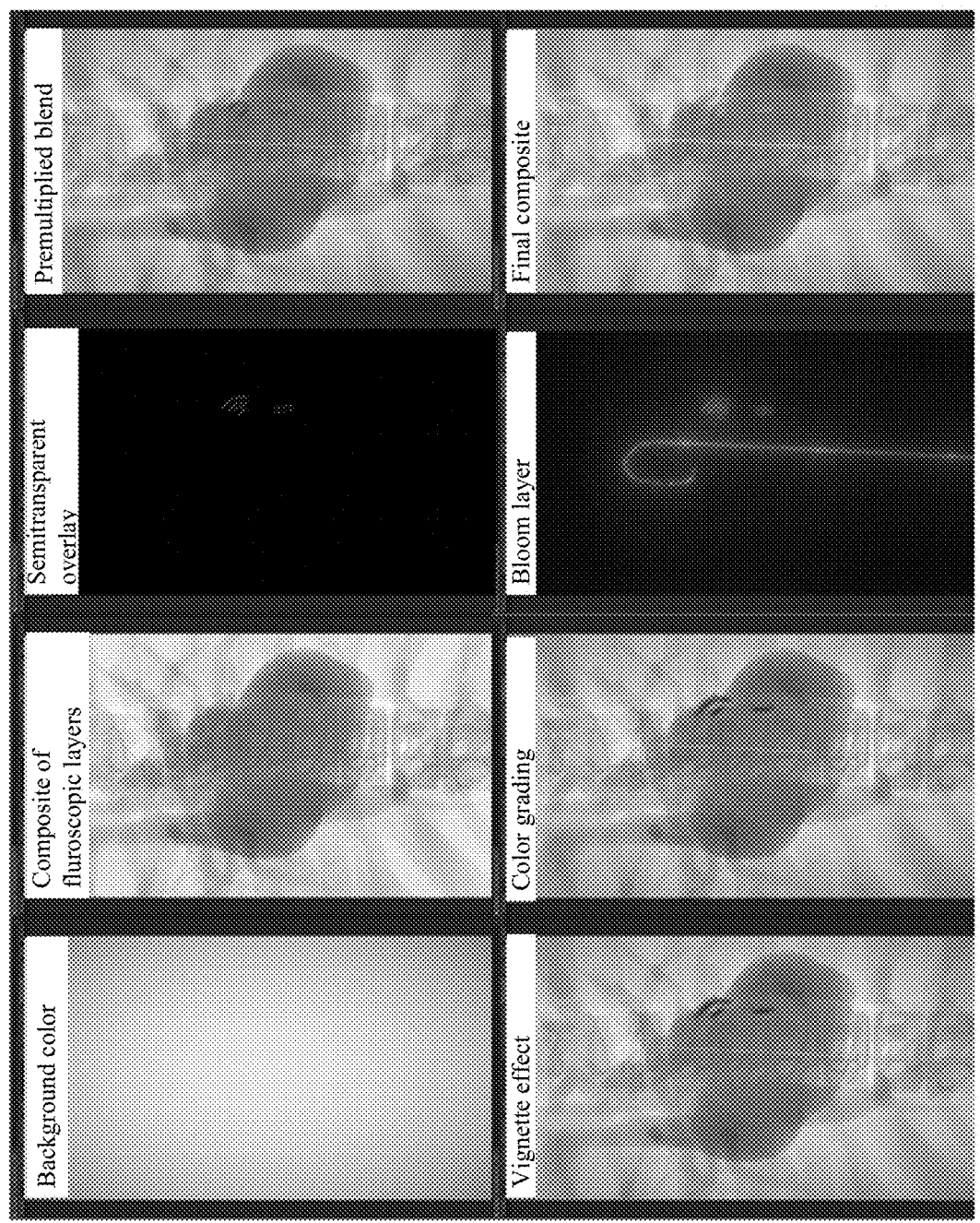
FIG. 2B illustrates how multiple images can be combined together, according to aspects of the disclosure.

FIG. 1B illustrates a series of images showing the rendering of multiple meshes under fluoroscopy, according to embodiments of the invention.

Post-Processing and Fluoroscopy

In some embodiments, the system can render optional color into fluoroscopy using the approach described in section 1, combined with layer composition, look-up tables, or tone-mapping, or any combination thereof. Meshes can be assigned a layer where each layer defines a look-up table that can be a mapping from the range 0-1 to a corresponding RGB value. Each layer can be rendered to a buffer that contains values between 0-1, representing how much attenuation that signal has undergone. The look-up table for each layer can be mapped over each of the pixels in that layer's buffer, and the result can be a new buffer of RGB values. All the layers of RGB buffers can then be composited together to produce a single RGB value. This color buffer can then be composited with an overlay layer that allows us to render semi-transparent materials over the fluoroscopy. All materials in the overlay layer can have pre-multiplied alpha channel (see the Nov. 6, 2019 Wiki article at https://en.wikipedia.org/wiki/Alpha_compositing) values which can prevent them from blending incorrectly with the underlying fluoroscopy color. Finally, post-processing effects like vignetting, color-grading and bloom can be applied to achieve the final stylized fluoroscopic effect.

FIG. 2B illustrates a series of example screenshots from the system that shows an example composition process to render stylized fluoroscopy with a custom post-processing strategy as described in Equation 2A (shown in FIG. 2A).

Discrete Vessel Network and Inter-Vessel Node Interpolation

In some embodiments, the system's physical simulation can be based on a discrete vessel network, where some or all gameplay can take place at vessel nodes and visualization can be accomplished by linearly interpolating the data defined at each vessel node through the space between it and that node's nearest neighbors. This interpolation in both rendering and player interaction can give the illusion of a continuous vessel network while allowing gameplay to be more precisely defined and constrained in the underlying discrete network.

Figure 9:
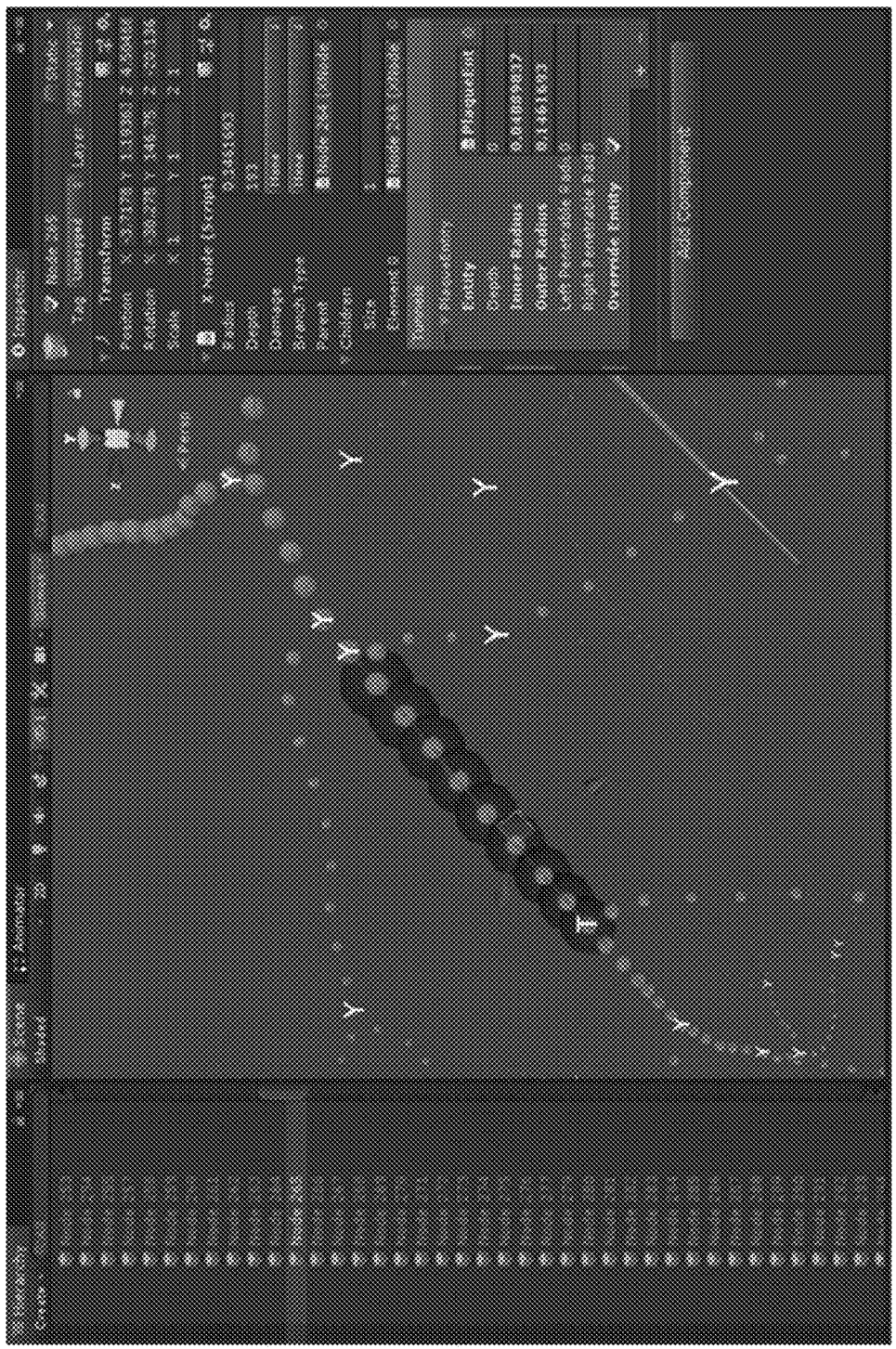
FIG. 9 illustrates an example of authoring a discrete vessel graph, according to aspects of the disclosure.

FIG. 9 illustrates an example of authoring a discrete vessel graph. A developer can place each node in the vessel graph assigning each node's parents and children, and any node-specific attributes (using, for example, the process in FIG. 3D). Attributes can include, but are not limited to: plaque, wires, balloon, dissection, stents (e.g., PTFE (covered) and DES (uncovered), perforation, inner radius, outer radius, or dye volume, or any combination thereof. FIG. 11 illustrates example logic that can use the attributes. All node attributes can be interpolated across the vessel network as described in the formulas in FIGS. 3A and 3B.

FIG. 9 shows an example of nodes in a screenplay. Node 265 has been selected (e.g., in inspector view). The tunnel information can indicate that we've added plaque to that node. (FIG. 9 shows red circles representing plaque.) A parent-child relationship data structure can be used to represent the vessels in the heart. FIG. 9 shows an option of plaque being applied to the vessels of the heart. Inner radius and outer radius information can be set for the nodes. When plaque is added to a node the inner radius and outer radius will change. This can be important because when the user takes action (e.g., inserts a balloon), it is important to have the correct inner and outer radiuses of the vessel (which can include any changes to the nodes caused by an attribute, such as plaque, stenosis, calcification, etc., applied to the nodes).

The X node script in FIG. 9 can hold the parent/child tree structure information. An author can set up this tree structure. As different attributes are applied to the node (e.g., wires can be applied to the nodes, a balloon can be put on the nodes, etc.) as a user plays the game, the data can be changed. Logic decisions (an example is shown in FIG. 11) can be made based on the set-up of the logic, how the user plays the game, and how the data changes as a result of user actions. For example, if an internal radius is smaller than a pre-determined amount and the user inserts a balloon, a perforation can be caused.

Figure 3C:
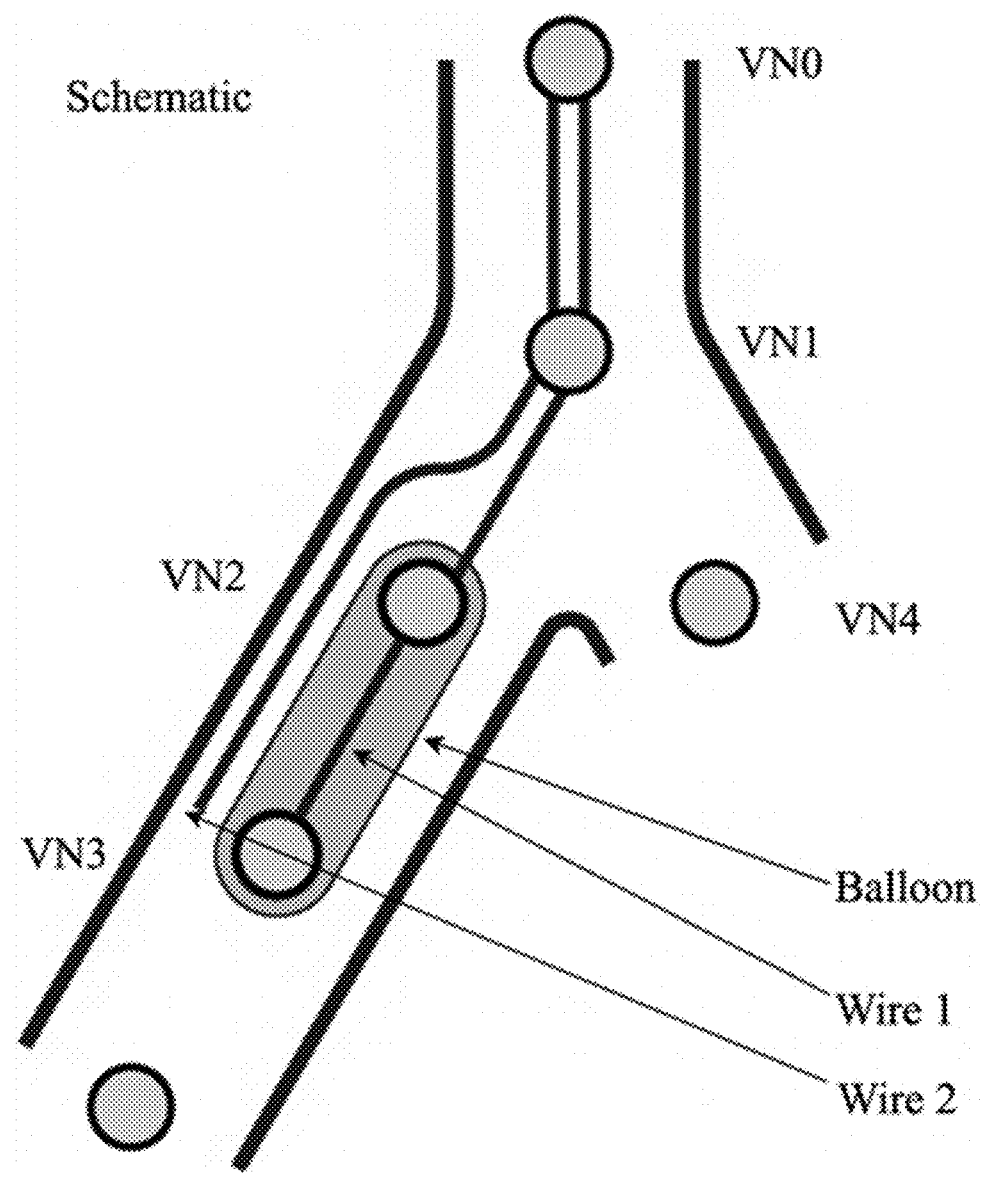
FIGS. 3C-3E illustrate various scenario visualizations in different rendering styles, according to some aspects of the disclosure.
Figure 3D:
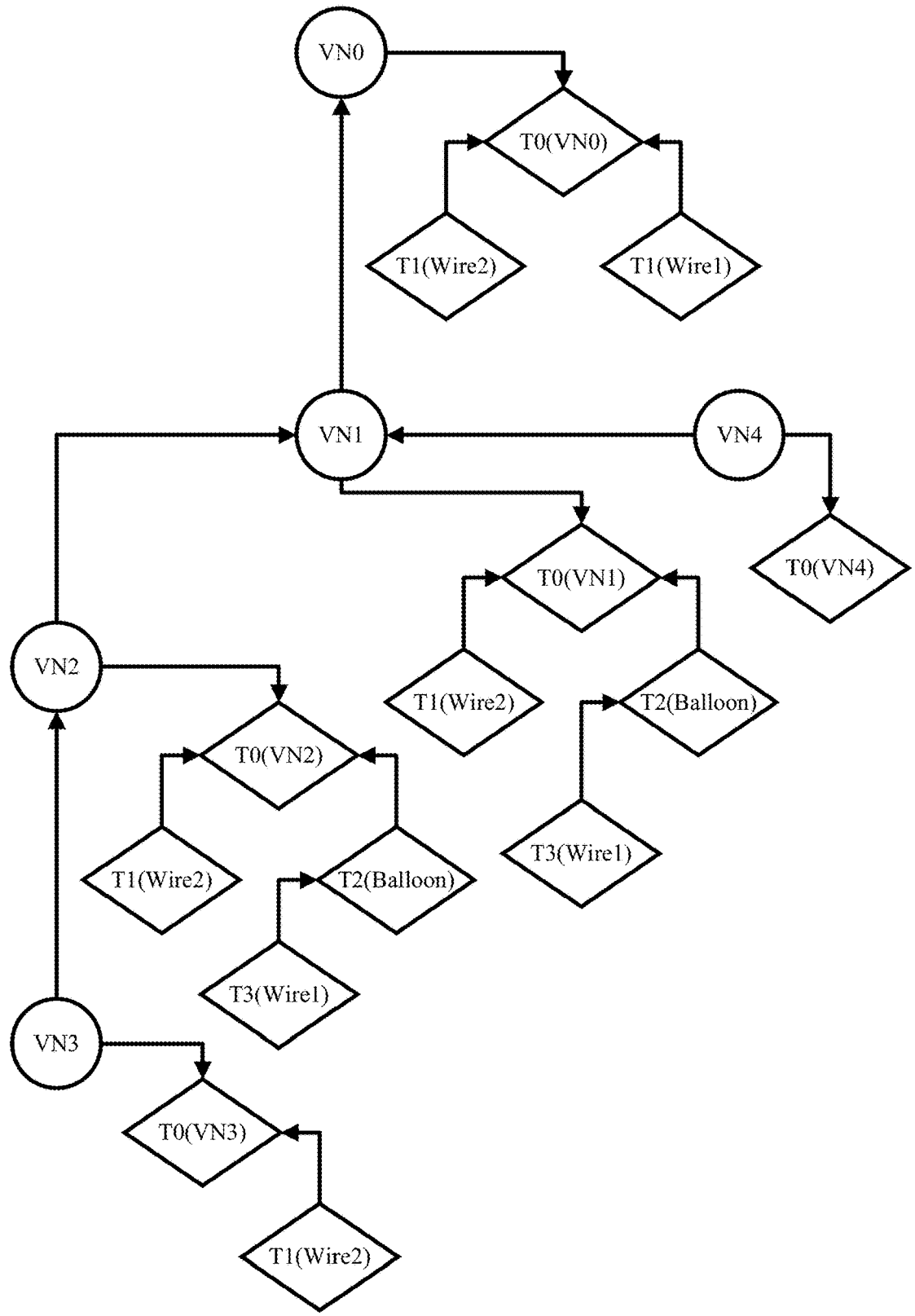

FIG. 3D illustrates an example tunnel tree process. Each vessel node (VN) of the vessel graph (VG) in the system can be parameterized by a tunnel tree (TT), which can be used to do intra-node layout for both physical simulation and rendering. The structure can be designed to be as decoupled as possible, and to present a clean, queryable interface to gameplay code which can make authoring the behavior of new tools or modifying the behavior of existing tools independent from the underlying data structures that can encode hierarchy and layout. A tunnel tree can be a classical tree data structure that can be made up of nodes called tunnel(s) (Ts) which can be tuples of a pointer to their parent tunnel and a generic type A which can be anything desired by the user of this data structure. In the case of the system, the generic type in our tunnel tree can be concretely an entity which can contain physical properties and gameplay properties used to define the system.

Equation 3B (shown in FIG. 3B) can describe the key data types driving physical simulation in the system. Note that while the notions of a "vessel graph" and "tunnel tree" are mentioned, there is no explicit data structure for either. Both can be represented implicitly through the pointers found on vessel nodes and tunnels. We can express the tree and tunnel data structure using parent-child relationships.

Figure 3E:
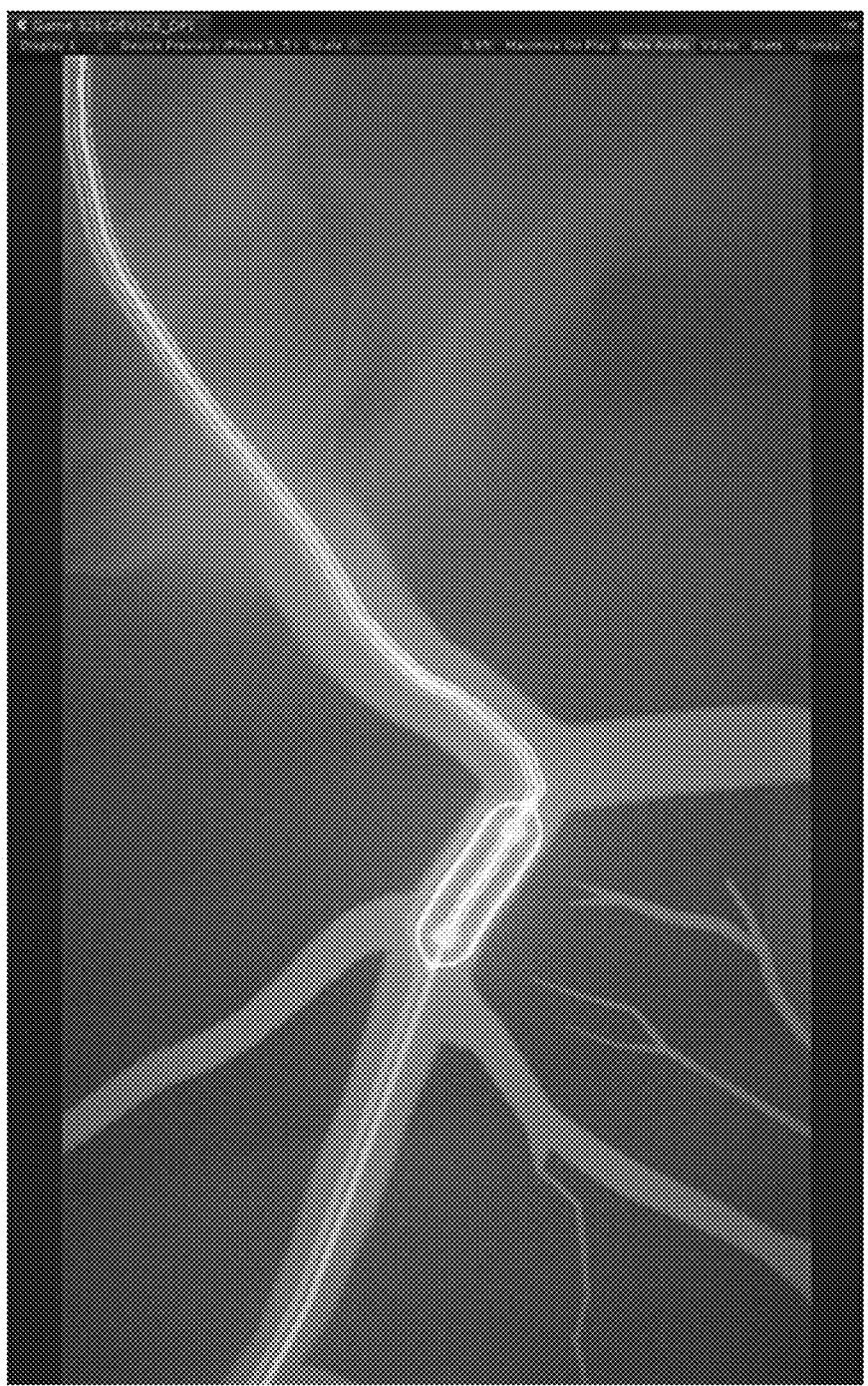

FIG. 3C is a sample visualization of a blood vessel tree with both a wire and balloon inside it, according to embodiments of the invention. This visualization can be used to contextualize FIG. 3D. FIG. 3D is a network representation of the data structures underlying the scenario visualized in FIG. 3C. FIG. 3E is a screenshot from the system showing the scenario described in both FIGS. 3C and 3D. FIGS. 3C, 3D and 3E all depict the same scenario in different rendering styles, according to some embodiments of the invention. FIG. 3C shows the scenario in a schematic view to show the relationships between objects that are present in the vessel network. FIG. 3D shows an example scenario in a tree view and illustrates the underlying data structure that describes the hierarchical relationships between objects present in the vessels. FIG. 3E shows the scenario as it is rendered in Jacthe system. Note that other systems may be used in other embodiments.

Gaming and Training Embodiments

In some embodiments, systems and methods are described for scenarios, actions, and/or video game and/or training elements. The game/training can be based on the practice of cardiology, and can include any of the following elements.
1. Interventional
2. Procedural
3. Metasystem

Interventional Gameplay Examples

One of the modes used in the cardio system can be Percutaneous Coronary Intervention (PCI), which can be a non-surgical method used to open narrowed arteries that supply the heart with blood (e.g., coronary arteries). Several PCI examples are listed in FIGS. 4A-4I.

Figure 4A:
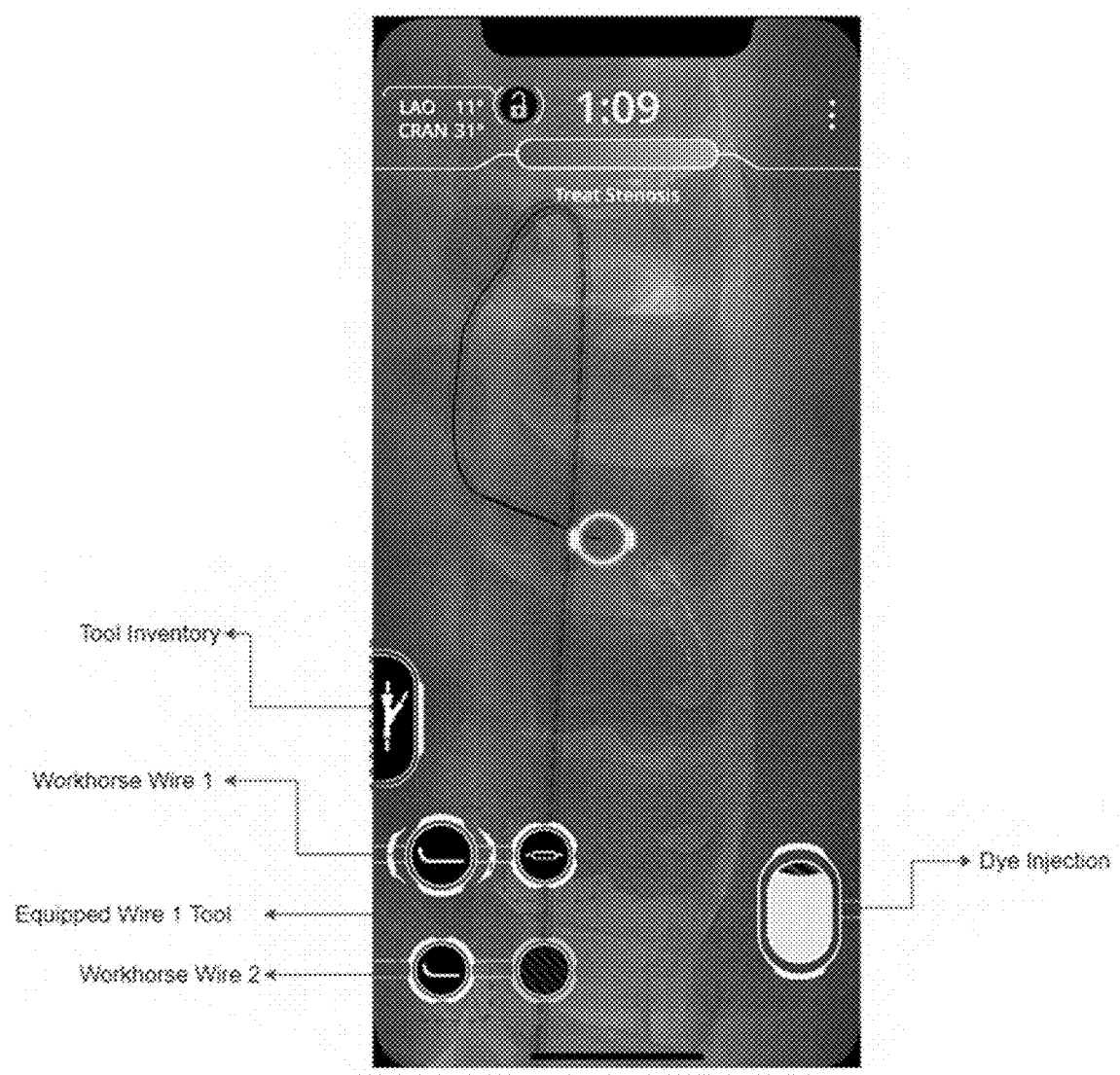
FIGS. 4A-4I illustrates various Percutaneous Coronary Intervention (PCI) examples, according to aspects of the disclosure.
Figure 4B:
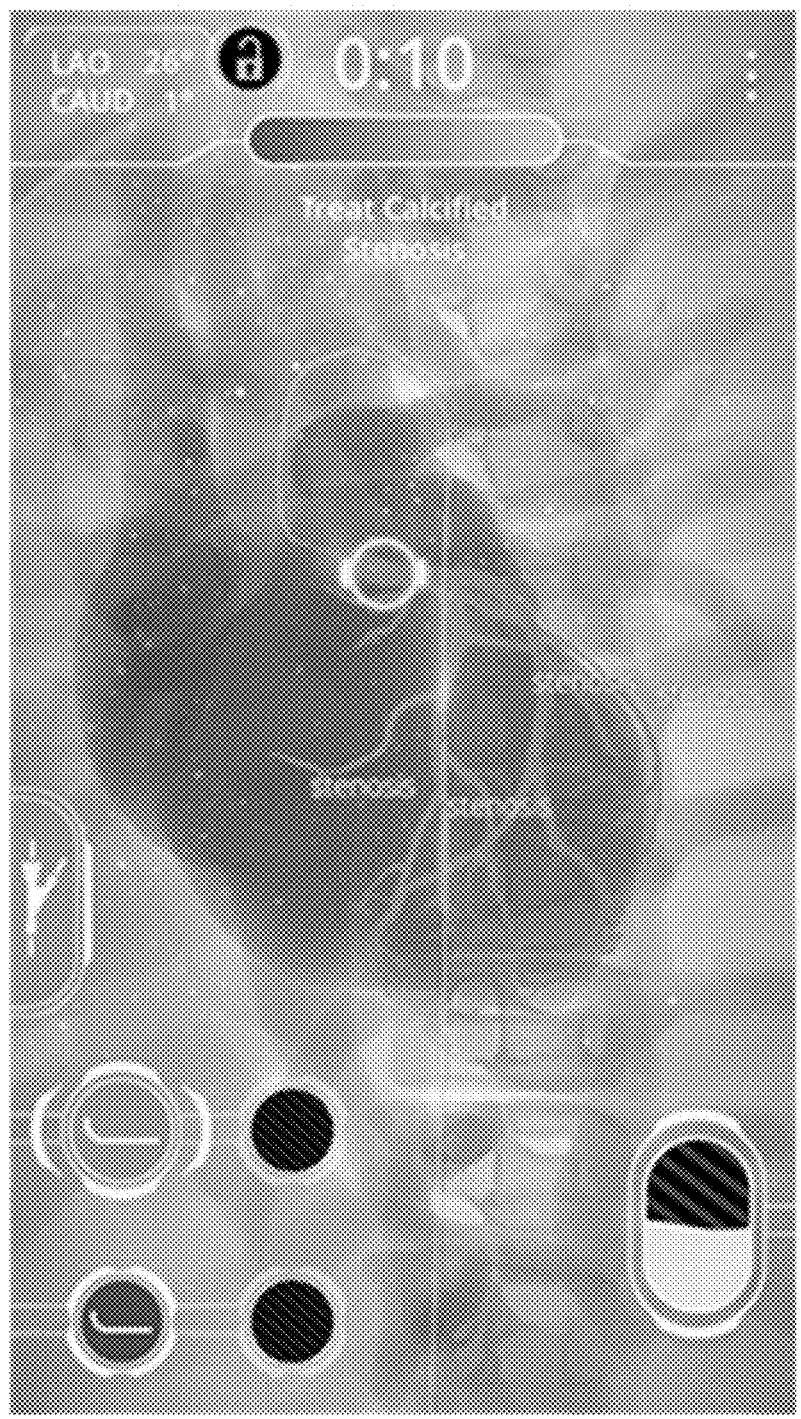
Figure 4C:
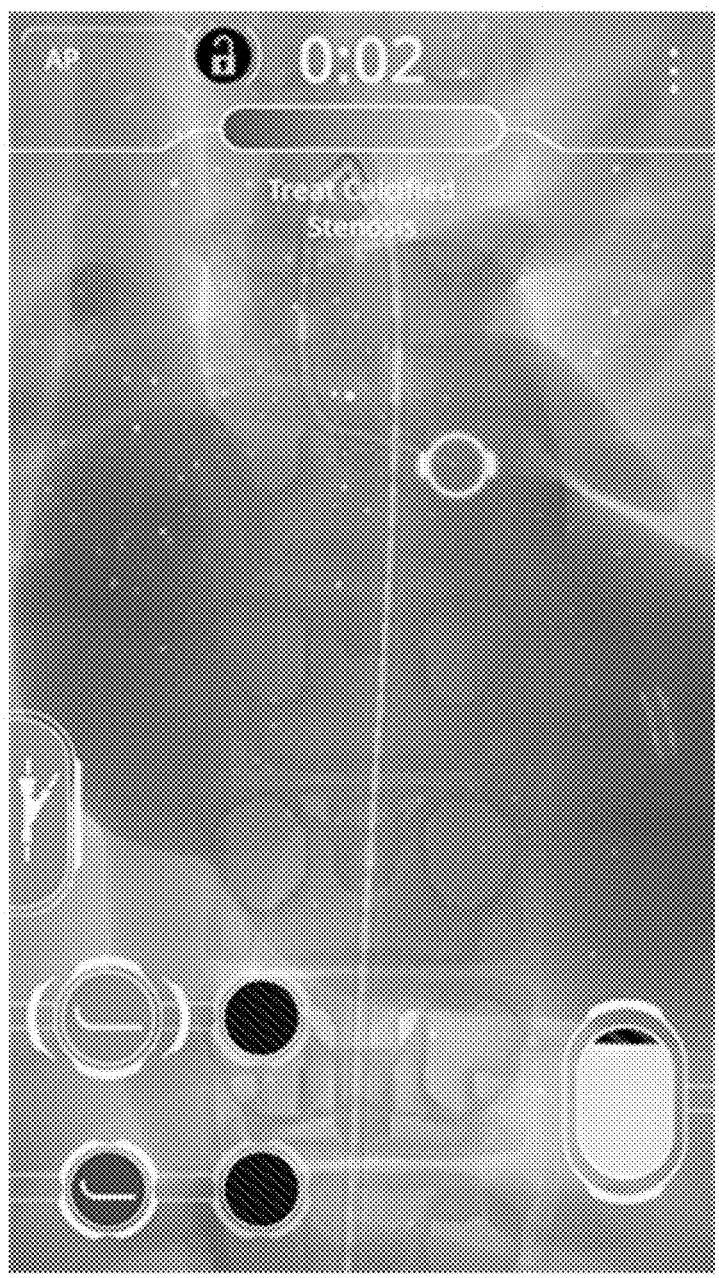
Figure 4D:
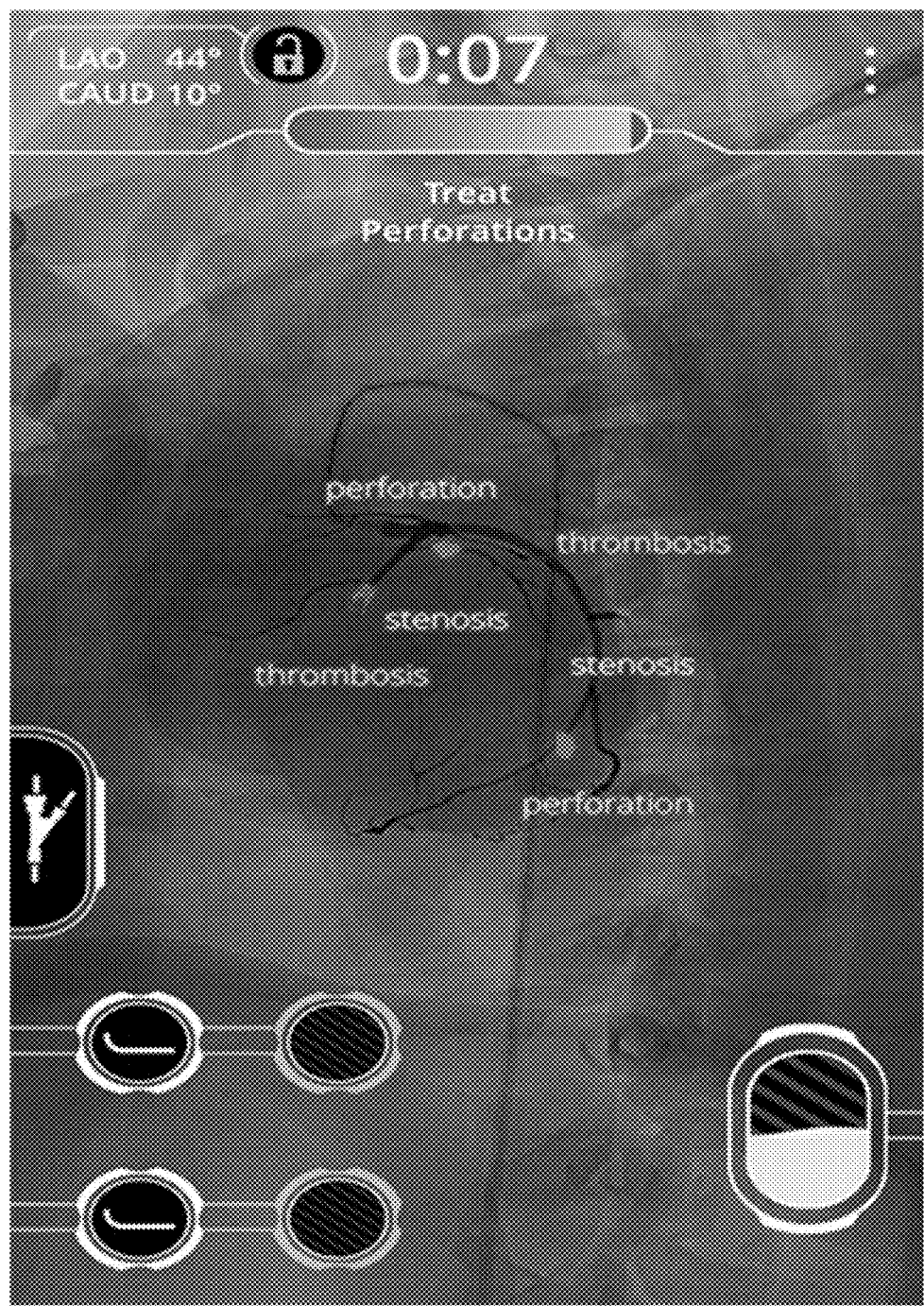

FIG. 4A illustrates an example user interface of an interventional gameplay for treating a condition such as stenosis. This can be a 3D environment that can be meant to look like a live X-Ray, but users can zoom in, zoom out, and/or move the camera into any position that will help them treat the patient. Similar to a real-life procedure, users can use dye and/or guide wires in order to navigate to different areas of the body. For example, player can have access to two workhorse wires and a variety of tools. FIG. 4A illustrates a tool inventory, a workhorse wire 1, an equipped wire 1 tool, a workhorse wire 2, and a dye injection element. FIGS. 4B-4C illustrates another example user interface of an interventional gameplay for treating calcified stenosis. FIG. 4D illustrates another example user interface of an interventional gameplay for treating perforations.

FIGS. 4E-4I illustrate examples where users can equip different tools in order to treat the issue presented to them. These tools can include balloons, stents, and/or drills that physicians can use in a given procedure. The user can receive a score based on the time it takes them to treat the patient and/or the amount of damage (if any) inflicted on the patient.

Figure 4E:
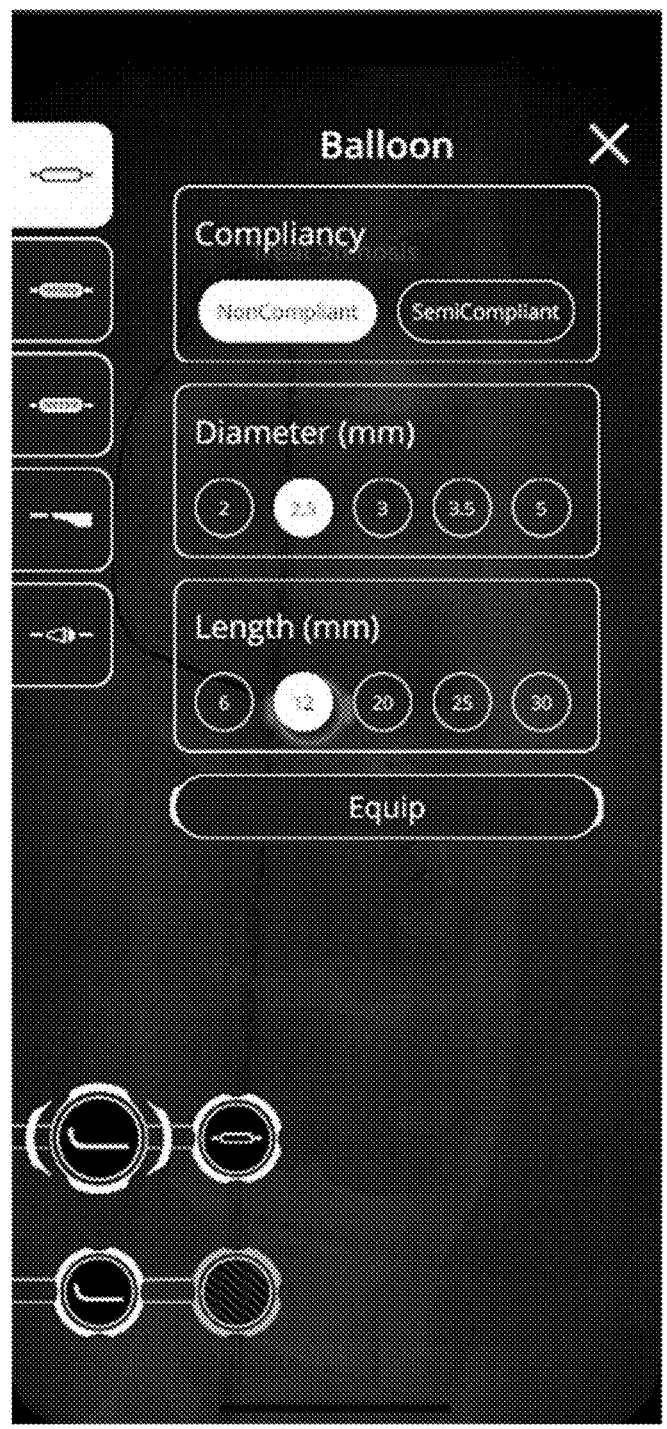
Figure 4F:
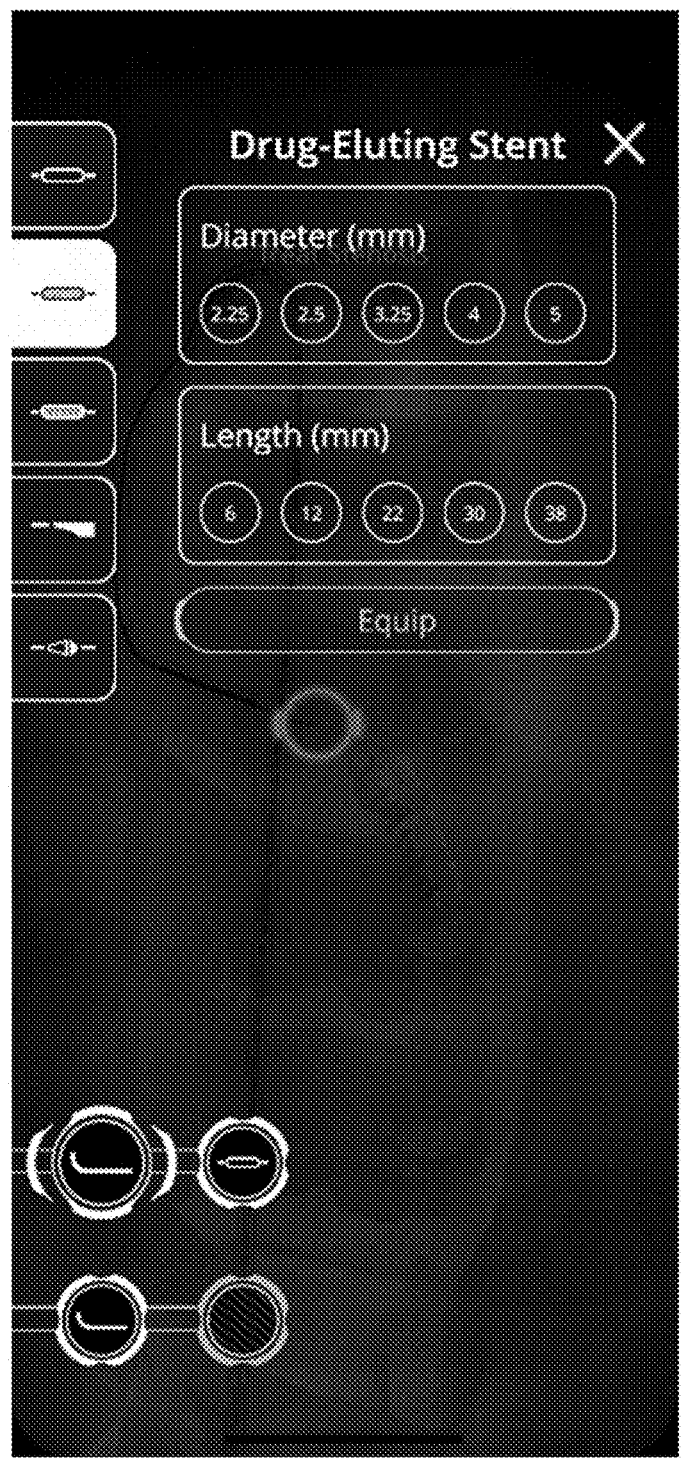
Figure 4G:
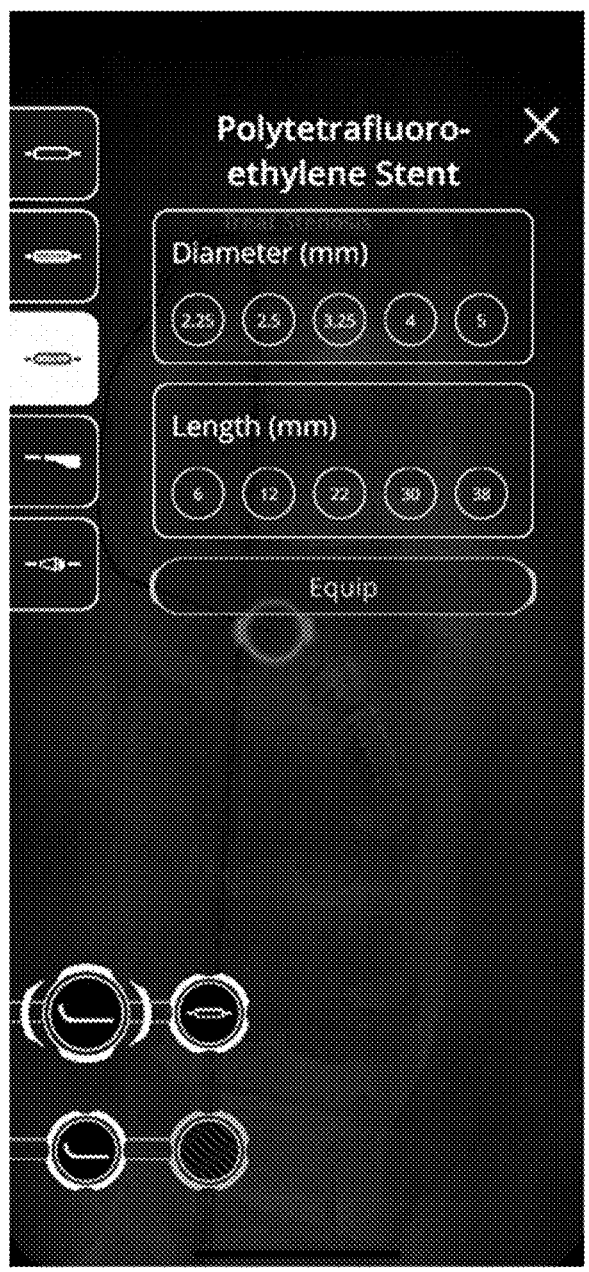
Figure 4H:
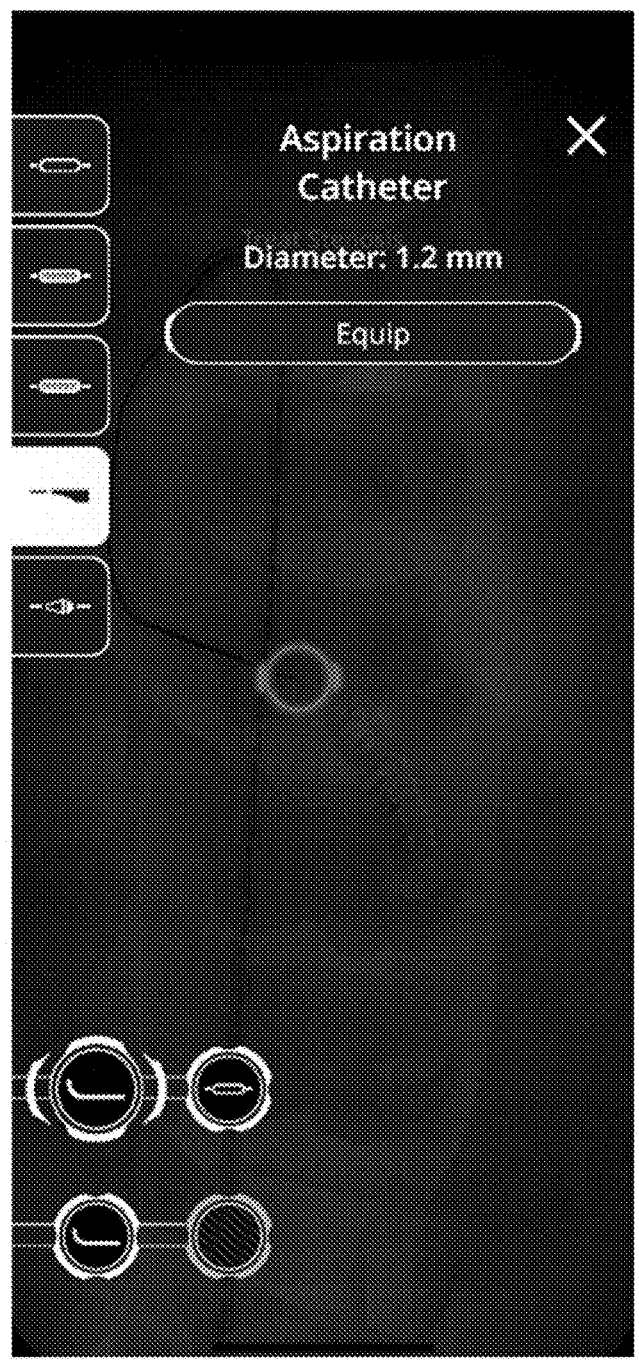
Figure 4I:
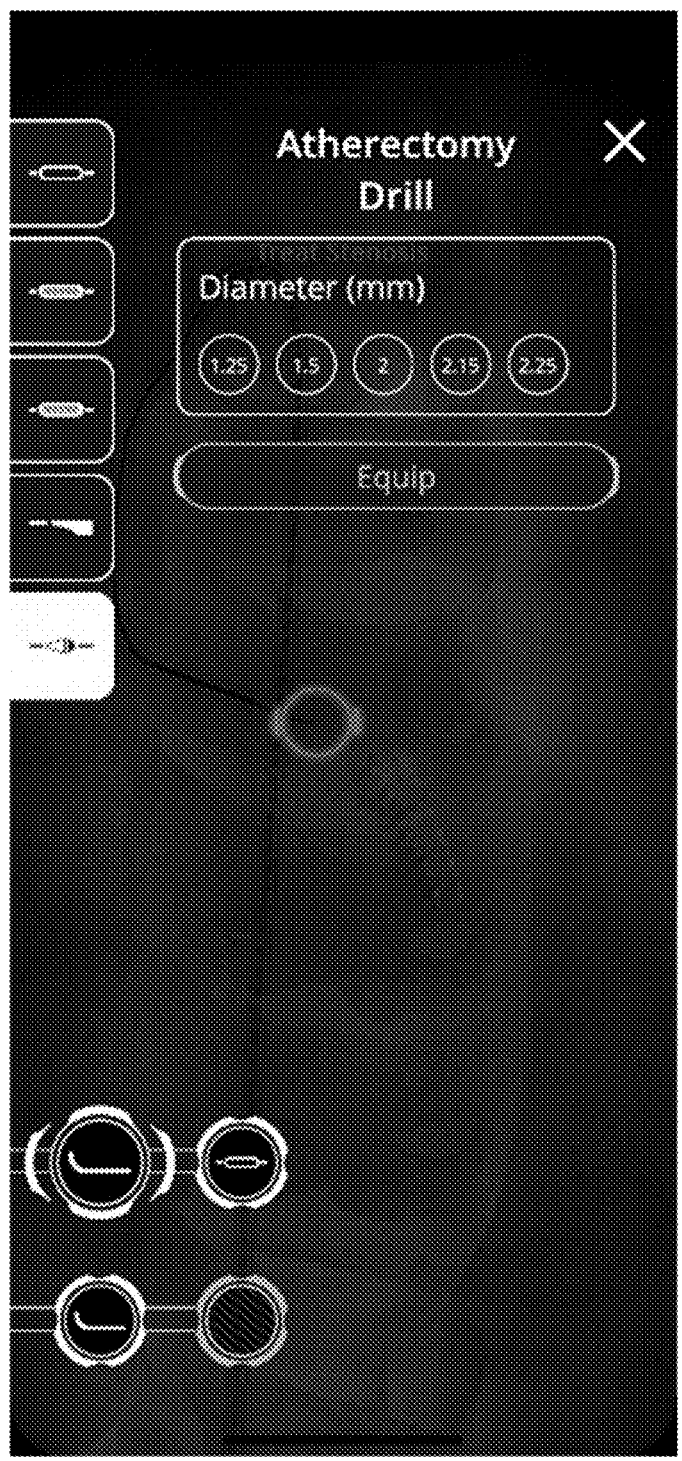

4E-4I illustrate example tools and options that can be used in the interventional gameplay. FIG. 4E illustrates an example balloon tool, where a diameter and length can be chosen. In addition, an option of non-compliant or semi-compliant can be chosen. FIG. 4F illustrates an example drug-eluting stent tool, where a diameter and length can be chosen. FIG. 4G illustrates an example polytetrafluoroethylene stent took, where a diameter and length can be chosen. FIG. 4H illustrates an example aspiration catheter tool, where a diameter can be chosen. FIG. 4I illustrates an example atherectomy drill tool, where a diameter can be chosen.

In some embodiments, cases that feature artwork and/or designs that are geared towards classic video game mentalities can be provided. In other embodiments, cases for practicing physicians can be provided. For example, Continued Medical Education (CME) credits (or similar credits for any other industry) can be earned and used to meet license (e.g., renewal) requirements. In some embodiments, a case/game can end when a patient is successfully treated or if the patient's health has decreased to a certain level (e.g., zero).

Procedural Gameplay

Diagnosis and Treatment modes can also be used.

Diagnosis

Figure 5A:
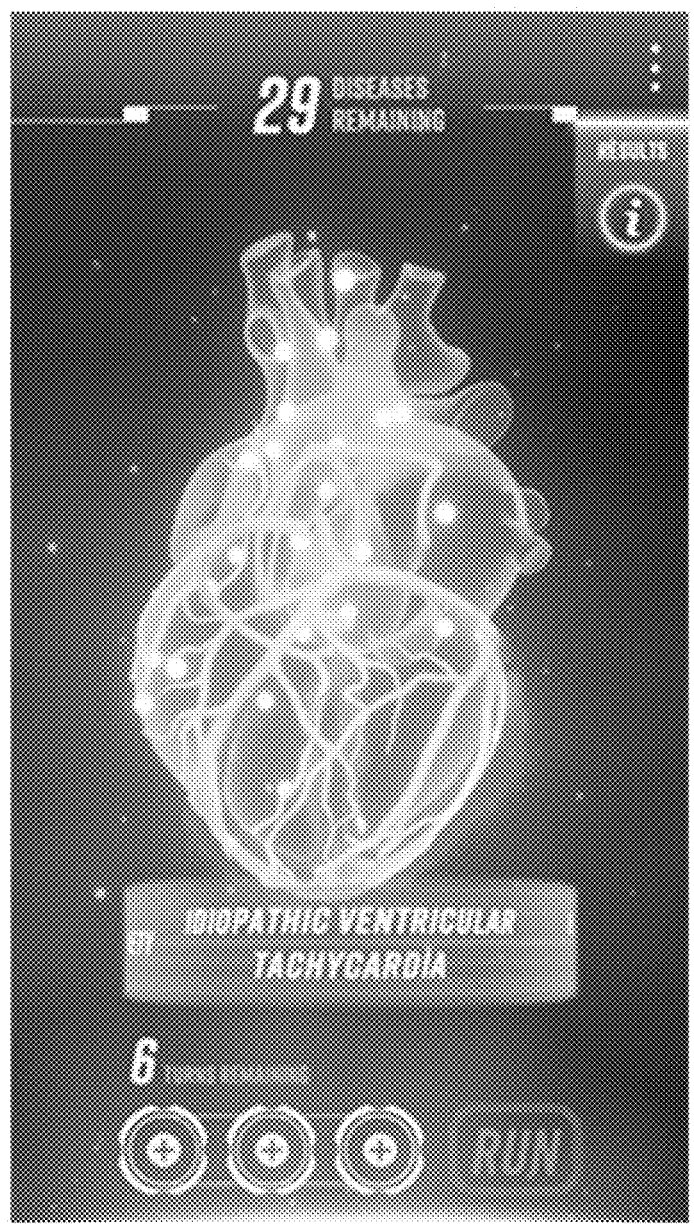
FIGS. 5A-5C illustrates various example screens that can be shown when making a diagnosis, according to aspects of the disclosure.

FIG. 5A illustrates a screen that can be shown to the user. The screen indicates a screen that can be shown to a user when making a diagnosis. When entering a diagnosis case, users can be met with a broad list of diseases that the patient has presented with (e.g., FIG. 5A indicates 29 diseases are remaining), and the user must deduce the correct disease by asking questions and/or running tests.

Figure 5B:

FIG. 5B illustrates an example of various tests and/or questions that can be presented to the player when they are trying to narrow down a list of potential diseases.

Figure 5C:
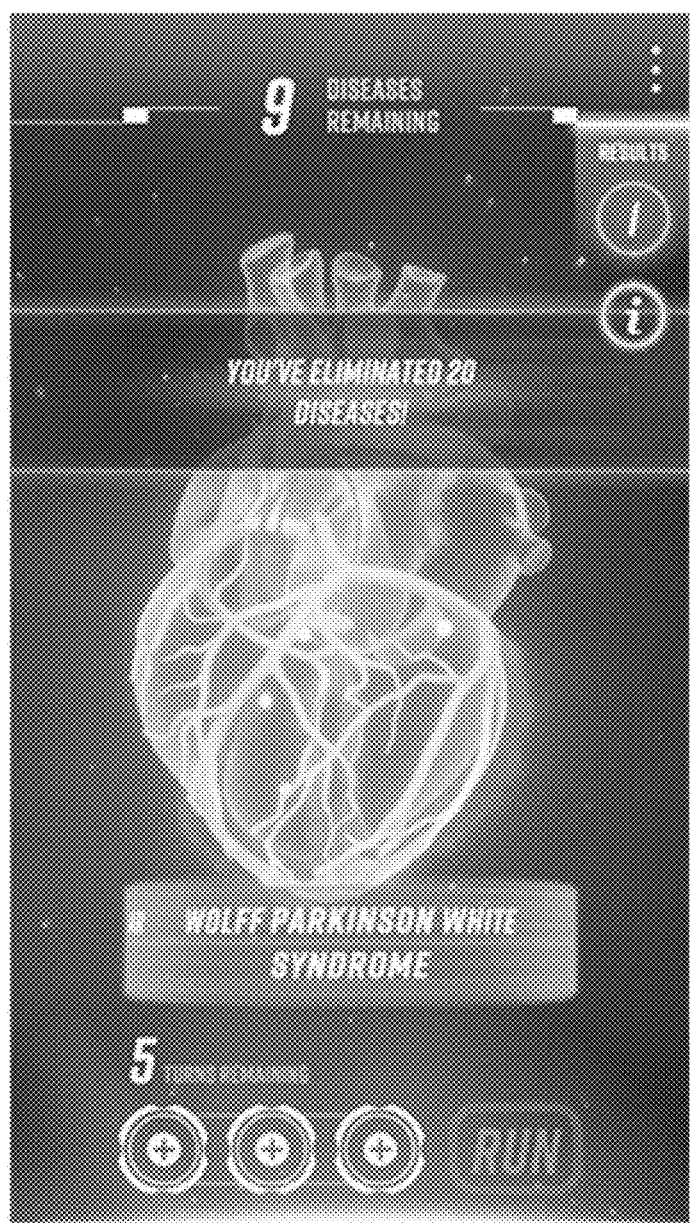

FIG. 5C illustrates a screen that can be shown once various diseases have been eliminated. Once a user asks questions and/or runs tests, they can eliminate a large number of diseases. In the example of FIG. 5C, only 9 diseases are remaining. The case can end when the player has narrowed the list of diseases down to one and/or they have run out of turns.

Example Treatment

Figure 6A:
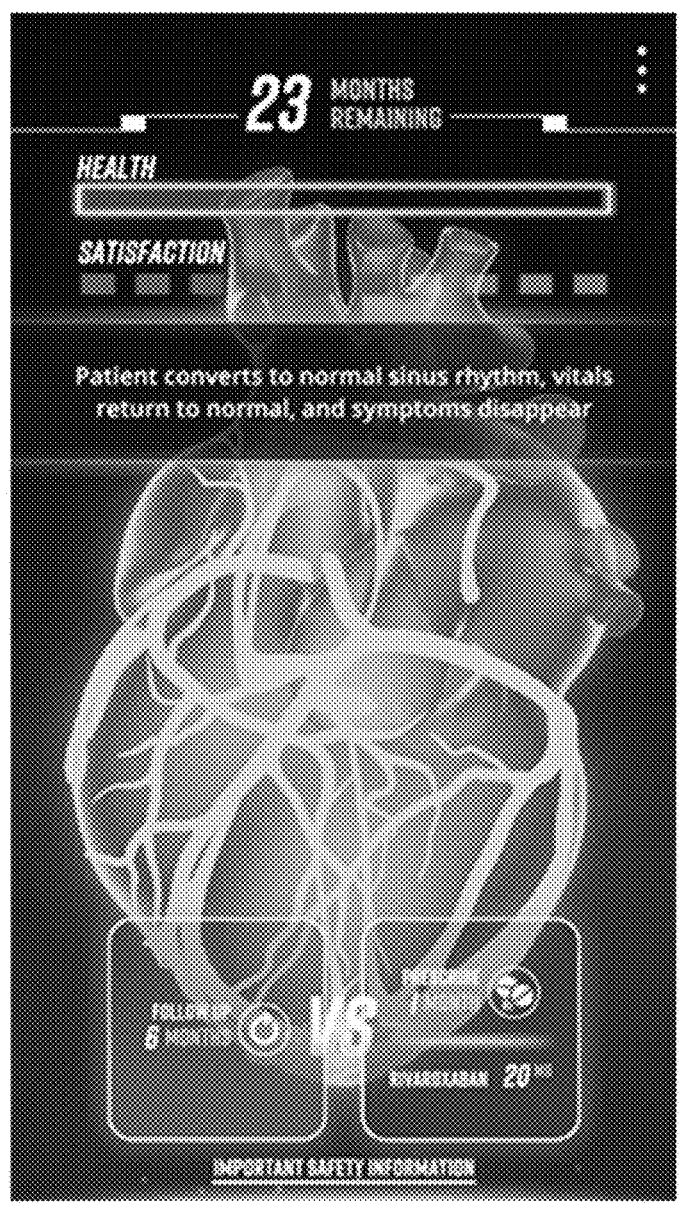
FIGS. 6A-6C illustrates various example screen that can be shown when choosing treatment options, according to aspects of the disclosure.

FIG. 6A illustrates a screen that can be shown. The amount of months remaining can be shown. When entering a treatment case, users can know the disease the patient currently has, and they can now choose a treatment path for their patient. This can be represented in gameplay by making players choose one of two potential choices. In FIG. 6A, the user can choose follow up in 6 months, or to prescribe a particular medicine for a month.

Figure 6B:
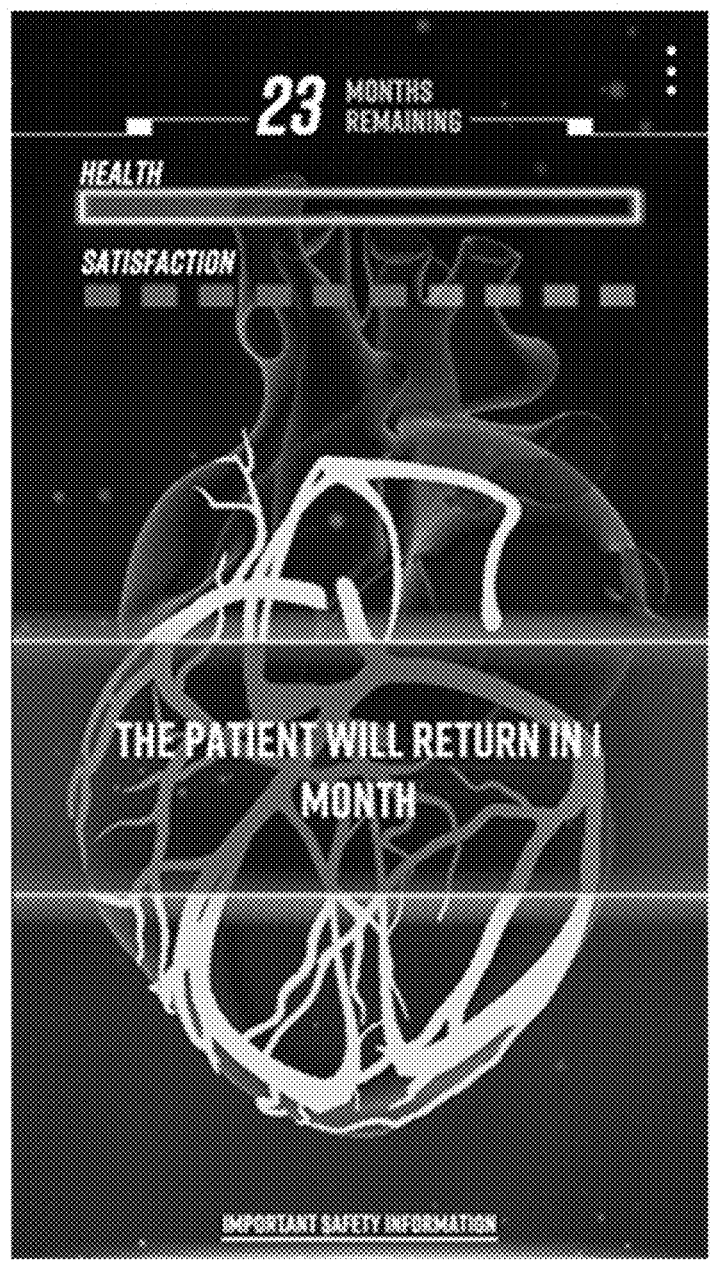

After a choice is made, the patient's health and/or satisfaction can have a positive or negative effect based on the choice made. For example in FIG. 6B, it indicates that there are 23 months remaining, and that in 1 month the patient will return.

Figure 6C:
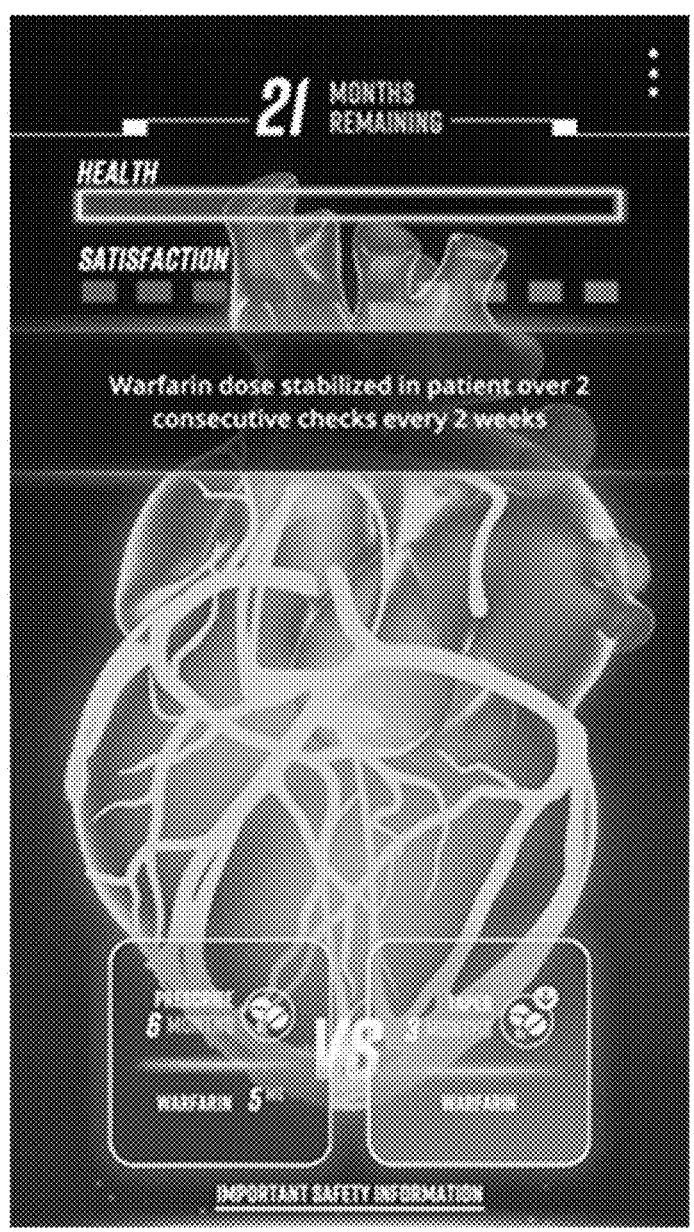

The user can then be presented with another round of treatment options based on their previous choice and/or the patient's reaction. For example, in FIG. 6C, it can indicate the result of the warfarin medicine, and provide two more options: prescribe medicine for 6 months, or taper the medicine for 3 months. The case can end when the patient has been successfully treated, and/or the user has run out of time to treat the patient.

Metasystem

Figure 7:
FIG. 7 illustrates various example cases that can help users gain experience which can then be used to unlock different collectibles within the system, according to aspects of the disclosure.

The example cases described above can present users with new cases, such as, for example, on a rotation. Thus, whenever a user launches the system, they can be met with new cases to play. FIG. 7 illustrates various example cases that can help users gain experience which can then be used to unlock different collectibles within the system. The users can then replay cases they have previously unlocked in order to obtain more rewards (e.g., collectibles, etc.).

Example Computer Embodiments

Methods described herein may represent processing that occurs within a system for cardiology game playing and/or training. The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Example Technical Benefits

Example technical benefits of the methods and systems described herein can comprise building a tree graph data structure and interpolating it so that less data is used. This can save on the amount of time needed to author the data. It can save memory because data does not need to be transferred back and forth as much. The data can be stored easier and/or loaded into memory easier because there is less data. For example, the actual data for a real x-ray of the vessels of a body require too much data to be practical in some situations. A simplified data structure can be used.

In some aspects of the disclosure, x-ray rendering can be represented. A representation of what an x-ray would look like can be created with much less data than an x-ray requires. By using meshes instead of volume metric data structure, it can be much easier to author, find, create, and animate data. Because a pixel shader is used, meshes can be used instead of a volume metric representation (e.g., an amount of thickness of a vessel). FIG. 1A can be used to estimate thicknesses so a volume metric representation is not required. For example, attenuation and the co-efficients used in 1A can be based on how thick something is. For example, bone can attenuate more than a soft organ.

In some aspects of the disclosure, multiple effects can be applied to the "x-ray" rendering (e.g., color grading, bloom, etc.) to make the "x-ray" look more interesting for training and playing purposes.

Example Computer System

Figure 8:
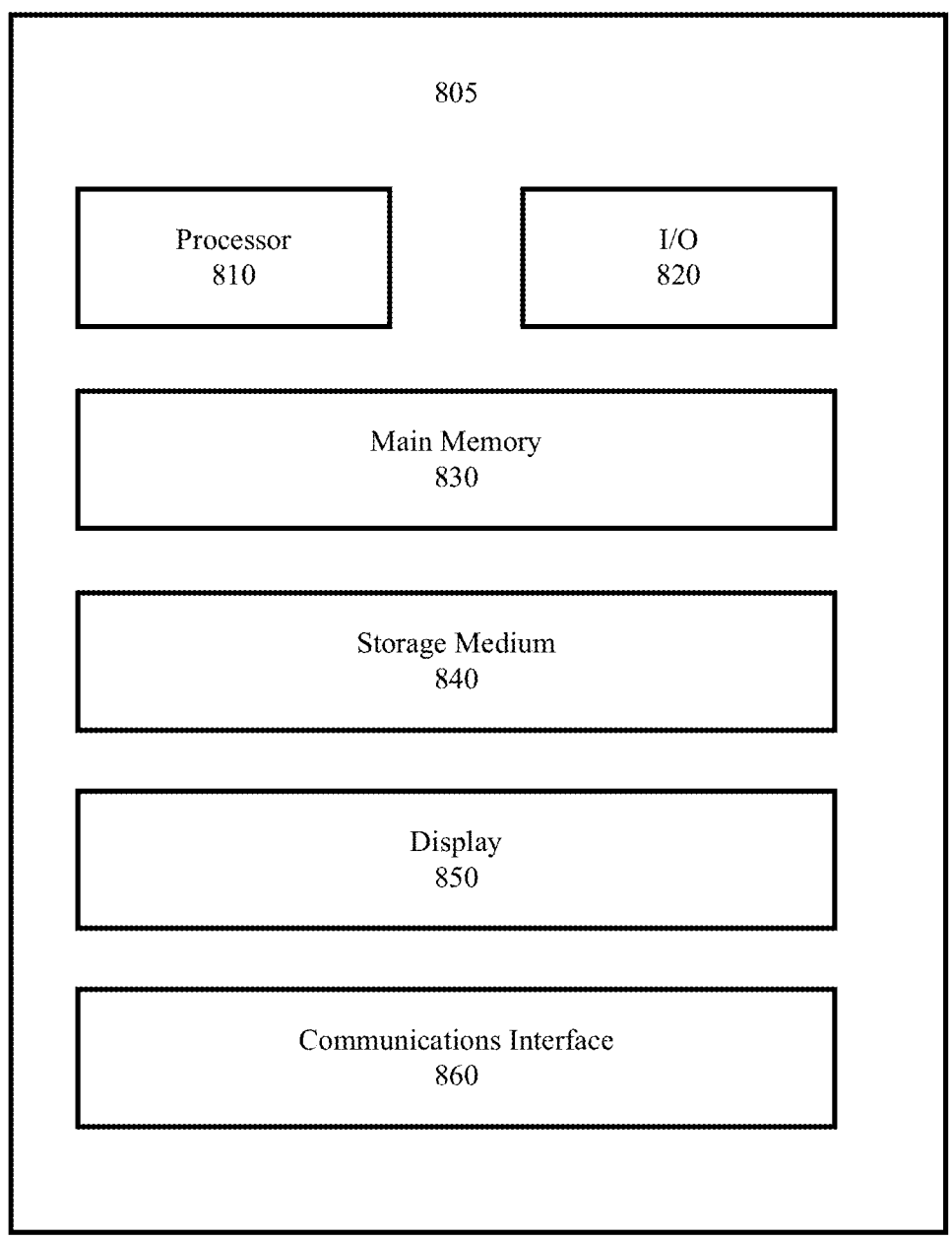
FIG. 8 illustrates an example computer, according to aspects of the disclosure.

FIG. 8 illustrates an example computer 805, according to some embodiments of the present disclosure. Computer 805 can include a processor 810 suitable for the execution of a computer program, and can include, by way of example, both general and special purpose microprocessors, and any one or more processor of any kind of digital computer. A processor can receive instructions and data from a main memory 830 (e.g., a read only memory or a random access memory or both). Processor 810 can execute instructions and the memory 830 can store instructions and data. A computer can include, or be operatively coupled to receive data from or transfer data to, or both, a storage medium 640 for storing data (e.g., magnetic, magneto optical disks, or optical disks). Information carriers suitable for embodying computer program instructions and data can include all forms of nonvolatile memory, including by way of example semiconductor memory devices, such as EPROM, EEPROM, flash memory device, or magnetic disks. The processor 810 and the memory 830 can be supplemented by, or incorporated in, special purpose logic circuitry. The computer 805 can also include an input/output 820, a display 850, and a communications interface 860.

CONCLUSION

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Accordingly, other implementations are within the scope of the following claims. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

In addition, it should be understood that any figures which highlight the functionality and advantages are presented for example purposes only. The disclosed methodology and system are each sufficiently flexible and configurable such that they may be utilized in ways other than that shown. For example, other steps may be provided, or steps may be eliminated, from the described flows, and other components may be added to, or removed from, the described systems.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A system, comprising:
a processor configured for:
(A) simulating permitted actions, comprising:
representing a vessel network as a discrete tree;
representing every node in the discrete tree as comprising another discrete sub-tree describing relationships between objects that are present at that node, wherein the relationships between the objects determine outcomes of permitted actions; and
determining what actions are permitted at every node using the relationships between the objects;
(B) rendering a fluoroscopic image, comprising:
rendering images with multiple meshes using a pixel shader;
determining front faces of meshes;
determining back faces of the meshes;
for each mesh, determining a distance to a front face of that mesh multiplied by attenuation;
for each mesh, determining a distance to a back face of that mesh multiplied by the attenuation;
determining a back face distance sum of distances to the back faces of the meshes multiplied by attenuations;
determining a front face distance sum of the distances to the front faces of the meshes multiplied by the attenuations; and
subtracting the back face distance sum from the front face distance sum; and
(C) applying simulated permitted actions to the fluoroscopic image, wherein each mesh is assigned with a layer and each layer is rendered to a buffer representing the attenuation that a signal traveled in that mesh.

2. The system of claim 1, wherein the relationships are hierarchical.

3. The system of claim 1, wherein physical properties between nodes are interpolated.

4. The system of claim 1, wherein summing the distances to the front faces of the meshes and/or summing the distances to the back faces of the meshes do not need to be done in a pre-defined order.

5. The system of claim 1, wherein the attenuation is assumed to be linearly proportional to the distance traveled in a mesh.

6. A method, comprising:
rendering a fluoroscopic image comprising multiple meshes;
determining front faces of meshes;
determining back faces of the meshes;
for each mesh, determining a distance to a front face of that mesh multiplied by attenuation;
for each mesh, determining a distance to a back face of that mesh multiplied by the attenuation;
determining a back face distance sum of distances to the back faces of the meshes multiplied by attenuations;
determining a front face distance sum of the distances to the front faces of the meshes multiplied by the attenuations; and
subtracting the back face distance sum from the front face distance sum, wherein each mesh is assigned with a layer and each layer is rendered to a buffer representing the attenuation that a signal traveled in that mesh.

7. The method of claim 6, wherein rasterized triangles on meshes are determined.

8. The method of claim 6, wherein summing the distances to the front faces of the meshes and/or summing the distances to the back faces of the meshes are done in any order.

9. The method of claim 6, wherein it is assumed that the attenuation is linearly proportional to the distance that the signal traveled in that mesh, wherein each layer defines a look-up table, the look-up table being a mapping from a range of values to a corresponding RGB value.

10. The method of claim 6, wherein an image is rendered for a gaming environment.

11. The method of claim 6, wherein the image is rendered for a training environment.

12. The method of claim 6, further comprising simulating actions comprising:
representing a vessel network as a discrete tree;
representing every node in the discrete tree as comprising another discrete sub-tree describing hierarchical relationships between objects that are present at that node; and
determining what actions are permitted at every node using the hierarchical relationships between the objects.

13. The method of claim 12, wherein the hierarchical relationships between the objects determine outcomes of permitted actions.

14. The method of claim 12, wherein physical properties between nodes are interpolated.

15. The method of claim 12, wherein simulation is done in a training environment.

16. The method of claim 12, wherein simulation is done in a gaming environment.

17. A system, comprising:
a processor, in communication with a database and a network, the processor configured for:
rendering a fluoroscopic image comprising multiple meshes;
determining front faces of meshes;
determining back faces of the meshes;
for each mesh, determining a distance to a front face of that mesh multiplied by attenuation;
for each mesh, determining a distance to a back face of that mesh multiplied by the attenuation;
determining a back face distance sum of distances to the back faces of meshes multiplied by attenuations;
determining a front face distance sum of the distances to the front faces of the meshes multiplied by the attenuations; and
subtracting the back face distance sum from the front face distance sum, wherein each mesh is assigned with a layer and each layer is rendered to a buffer representing the attenuation that a signal traveled in that mesh.

18. The system of claim 17, wherein summing the distances to the front faces of the meshes and/or summing the distances to the back faces of the meshes are done in any order.

19. The system of claim 17, wherein it is assumed that the attenuation is linearly proportional to the distance traveled in that mesh.

20. The system of claim 17, wherein an image is rendered for a gaming and/or training environment.

* * * * *